United States Patent [19]

Badaoui et al.

[11] Patent Number: 5,023,867
[45] Date of Patent: Jun. 11, 1991

[54] PROTOCOL AND APPARATUS FOR SELECTIVELY SCANNING A PLURALITY OF LINES CONNECTED TO A COMMUNICATION DEVICE

[75] Inventors: Mohamed Badaoui, Nice; Richard Dambricourt, Cagnes Sur Mer; Jean-Paul Franquenouille, Saint Jeannet; Christian Garcia, La Gaude; Yves Granger, Antibes; Sylvie Spalmacin-Roma, Le Pecq, all of France

[73] Assignee: International Business Machines Corporation, Armonk, N.Y.

[21] Appl. No.: 299,865

[22] Filed: Jan. 19, 1989

[30] Foreign Application Priority Data

Jan. 22, 1988 [EP] European Pat. Off. ......... 88480004.6

[51] Int. Cl.$^5$ ............................................. H04Q 11/00
[52] U.S. Cl. ...................................... 370/56; 370/95.2
[58] Field of Search ................. 370/56, 85.8, 95.2, 370/112, 95.1; 340/825.1, 825.12, 825.13, 825.54

[56] References Cited

U.S. PATENT DOCUMENTS

| | | | |
|---|---|---|---|
| 3,496,301 | 2/1970 | Kaenel | 370/56 |
| 4,409,683 | 10/1983 | Woodward | 370/112 |
| 4,726,017 | 2/1988 | Krum et al. | 370/85.8 |
| 4,737,950 | 4/1988 | Fechalos | 370/56 |
| 4,766,590 | 8/1988 | Hamada et al. | 370/56 |
| 4,858,230 | 8/1989 | Duggan | 370/95.2 |

FOREIGN PATENT DOCUMENTS 0077863 5/1983 European Pat. Off. .
0185260 6/1986 European Pat. Off. .
8202965 9/1982 PCT Int'l Appl. .

Primary Examiner—Douglas W. Olms
Assistant Examiner—Wellington Chin
Attorney, Agent, or Firm—Edward H. Duffield

[57] ABSTRACT

A scanning protocol is provided for the scanning of a plurality of serial transmission lines connecting users' devices to the scanning means of a communication device, said lines being coupled to the scanning means through line interface couplers (LICs) having each a wired address (n,n', ...) known to the scanning means. This scanning protocol requires that for each LIC configuration, a given LICn having a wired address n be re-addressable with a logical address n' corresponding to the wired address of any other active LICn'. This is done in order to determine, for said LIC configuration, the shortest possible scanning scheme including all the active LICs. The re-addressing of a LICn of wired address n, with a logical address n', includes the steps of: resetting the LICn to be affected a logical address n'; setting the logical address n' into LICn; locking said logical address n' into said LICn, and enabling the lines (26) connected to LICn re-addressed with logical address n'.

8 Claims, 12 Drawing Sheets

FIG. 7

| | | | | | | | | |
|---|---|---|---|---|---|---|---|---|
| CAx | X | X | B2=E0 | X | B4=E1 | X | X | X |

| | | | | | | | | |
|---|---|---|---|---|---|---|---|---|
| CBx | X | B1=b0 | B2=b1 | B3=b2 | B4=En | X | X | X |

| | | | | | | | | |
|---|---|---|---|---|---|---|---|---|
| CAx+1 | X | X | E0 | X | E1 | X | X | X |

| | | | | | | | | |
|---|---|---|---|---|---|---|---|---|
| CBx+1 | X | $\overline{b0}$ | $\overline{b1}$ | $\overline{b2}$ | En | X | X | X |

PROTOCOL AND APPARATUS FOR SELECTIVELY SCANNING A PLURALITY OF LINES CONNECTED TO A COMMUNICATION DEVICE

FIELD OF THE INVENTION

The invention relates to a method for scanning a plurality of serial transmission lines operated at different rates and connected to the scanning means of a communication device or communications controller.

BACKGROUND ART

The problem of scanning transmission lines occurs, for instance, in communication controllers as described in European Patent EP-A-0.077.863 (FIG. 1). Communication controllers are connected to a plurality of user's terminals or devices T through line adapters. Those line adapters are connected to several transmission lines by scanning means which perform the cyclic scanning of the data and control slots provided on the different lines. A given line adapter includes a plurality of Line Interface Couplers (LIC) as described in said patent EP-A-0.077.863, each of which is connected to users terminals or devices through several serial lines operated at various speeds.

Generally, in a communications controller like the IBM 3725 controller, each LIC which is physically plugged to the scanner (front end scanner or FES in said patent) is scanned, even if inactive. This wastes time and throughput when a given line adapter is not connected to the allowed maximum number of active lines. For instance, if each line adapter can support 8 LICs, LIC0 to LIC7) each LIC supporting four 56 KBPS lines, and if LIC0 and LIC7 are the only active LICS, the scanning of the lines is nevertheless performed from LIC0 to LIC7, including inactive LICS 1 to 6. Furthermore, if the throughput of the line adapter is entirely dedicated to the scanning of one high speed line (256 kbps), this line has necessarily to be connected to the LIC having the physical or wired adress 0 on the line adapter in order to reduce the scanning time to a minimum. Consequently, lines have to be unplugged at each configuration change by the user. This is likely to generate much trouble and hardware difficulties.

Besides, according to the known scanning scheme, the cost of the necessary hardware rises rapidly if several high speed lines have to be scanned: even if they are not simultaneously activated, they cannot be simultaneously connected to the same line adapter, and thus more line adapters are needed.

OBJECT OF INVENTION

Therefore, the purpose of the present invention consists in giving more flexibility to the scanning process for a plurality of lines connected to scanning means through LICs. More particularly, but without restraining the invention to communications controllers, it is an object of the invention to scan only those LICs that have, at a given moment, lines actually activated, with said scanning being done according to a priority scheme which can be freely chosen by the operator. It is another object of the invention to allow to a scanner to be connected to a number of lines corresponding to an overall throughput greater than the scanner's nominal throughput, provided that at a given moment, the sum of the line throughputs is smaller than the scanner's maximum throughput.

It is still another object of the invention to allow the user to modify the scanning order of the transmission lines independantly of the physical connection scheme of said lines to the LICs.

SUMMARY OF THE INVENTION

According to the invention, a scanning protocol is provided for scanning a plurality of serial transmission lines connecting user's devices to the scanning means of a communication device, said lines being coupled to the scanning means through line interface couplers (LICs) having each a wired address (n, n' ...) known to the scanning means. This scanning scheme optimizes the scanning of a LIC configuration in that a given LICn, having a wired address n, is re-addressable with a logical address n' corresponding to the wired address of any other active LICn', thus enabling determination, for said LIC configuration, of the shortest possible scanning scheme including all the active LICs.

A logical addressing function is therefore provided and implemented on the LICs which permit a LIC having a wired address n' with respect to the scanner to be given a logical address n. Similarly, the LIC having the wired address n can be given the logical address n', so that both LICs have their respective addresses swapped with respect to the normal scanning scheme.

However, the address change may not necessarily consist of an address swap; any LIC can simply be given a logical address corresponding to the physical address of any other LIC.

BRIEF DESCRIPTION OF THE DRAWINGS

FIG. 7 represents the control slots of the frames involved in a logical adressing operation.

DETAILED DESCRIPTION OF THE INVENTION

Figure 1:
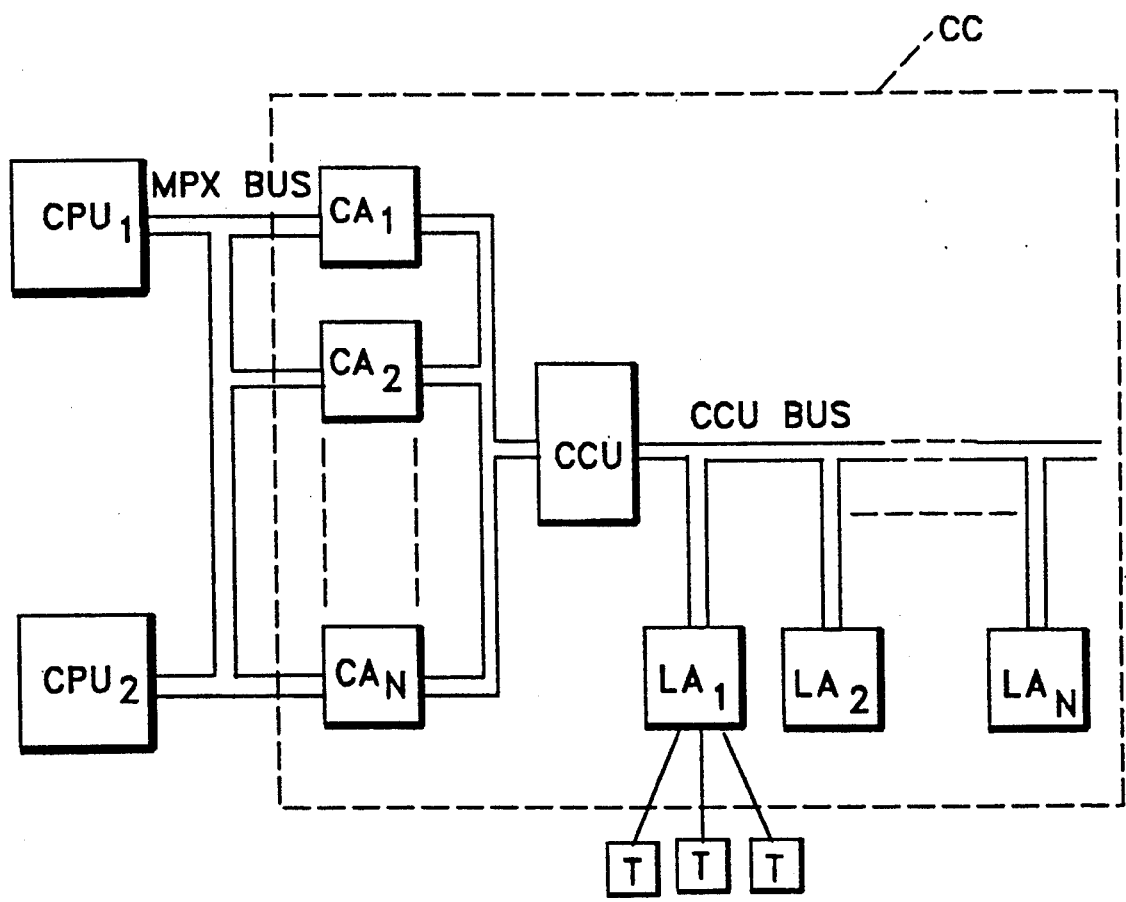
FIG. 1 represents a schematic block diagram of a prior art system wherein the invention may be used.

FIG. 1 illustrates a global scheme of a system which can use this invention. Communication Controller CC is an element of a teleprocessing network of a type disclosed in the book "Tele- informatique", by G. Macchi and J. E. Guilbert, 1979, published by Dunod, more specifically, under chapter 10. In the communications controllers, a central control unit CCU handles the data transmitted between terminals T and central processing units CPU1 and CPU2. Unit CCU is connected to multiplex channel (MPX) buses for the central processing units CPU1 and CPU2 via channel adapters CA1, . . . CAn. It is also coupled to terminals T via line adapters LA1, . . . , LAn connected to a CCU bus.

Figure 2:
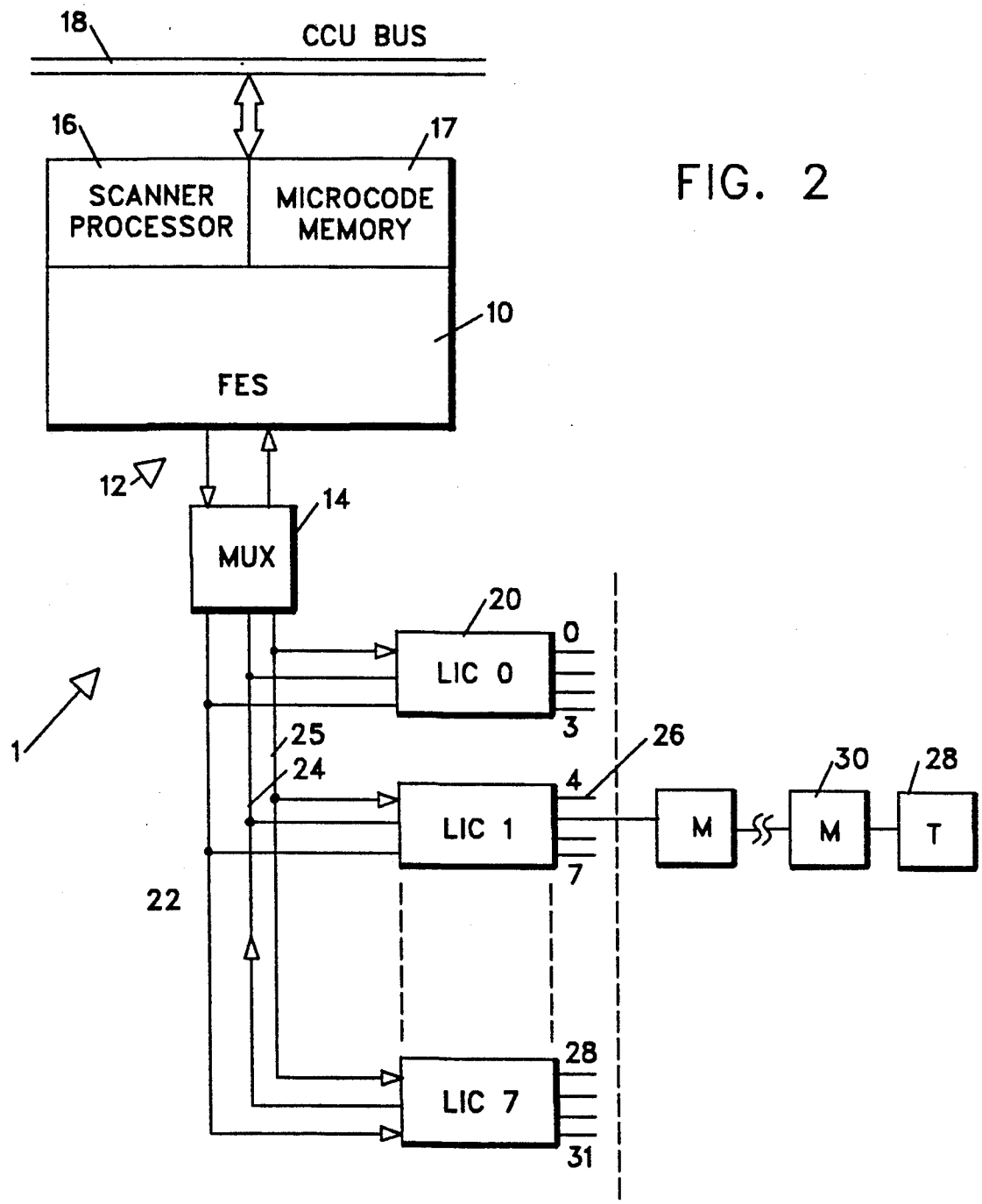
FIG. 2 represents schematically the transmission subsystem of a communication device.

FIG. 2 is a schematic diagram of a line adapter (1) as referenced by LA in FIG. 1. Such a line adapter (1) is comprised of a microprocessor (16) running the microcode contained in a microcode memory (17), and of a scanning logic (10) designated by FES (10) (Front End Scanner) in the figure. In the following developments, the elements referenced (10, 16, 17) will be called "Scanning means", and more details are available about them in European patent No. EP-A-0.048.781 related to a communication line adapter for a communication controller.

In said patent, the data received or transmitted by users terminals over the transmission terminals and the line interface circuits (LICs) are exchanged between the scanning means and LICs through a parallel bus.

In the present invention, which concerns the addressing of the line interface circuits (LICs), the data exchange between the LICs (20) and the scanning means will preferably be done through a multiplexing circuit (14) and a serial link (12) as will be further described. In addition to the data exchange on serial lines (22,24), each LIC receives appropriate clocking on line (25) provided by the scanning means.

It is to be noted that this structure does not limit the scope of the invention concerning the LIC addressing.

Similarly, the scope of the present invention is not to be limited to the field of communications controllers per se, but may be used each time a scanning device is cyclicly scanning several line interface circuits (or equivalent) known to the scanning means by their wired addresses.

However, for greater simplicity of the following developments, we will assume that the various serial transmission lines (26) are connected to the line adapters (1) of a communication controller, as described in European patent EP-A-0.077.863 with reference to the FIG. 2 thereof.

In the IBM 3725 Communications Controllers, when the scanner means have to exchange data with a transmission line connected to a given LIC, said scanner means address said LIC and line with an address value corresponding to the physical address of said LIC and line on a LIC unit board. This addressing is performed through a parallel address bus serving all the LICs, as described in the IBM patent EP-A-0.077.863.

This structure has advantages so long as LICs are close to the scanner means in the machine, and further provided that the customer doesn't need to unplug and invert lines or LICs.

However, as soon as the customer needs to put the LIC boards in a remote location or to modify the line plugging scheme (for instance for high speed "night processing") the physical addressing of the LICs by a parallel bus becomes a burden.

Furthermore, in the known LIC addressing scheme, a scanner can support 8 LICs and a total of 32 transmission lines. The connection of only one more line would require the installation of another scanner. In the contrary, as will be explained below, the LIC addressing and scanning method according to the invention will allow installing a much greater number of LICs and lines on the scanner provided that the throughput required by the lines actually active does not exceed the nominal throughput of the scanner.

PRINCIPLE OF THE LIC LOGICAL ADDRESSING

According to the invention, LIC logical addressing will be achieved by no longer scanning all the LICs in a predetermined sequence, but instead by scanning the LICs selectively.

Figure 3:
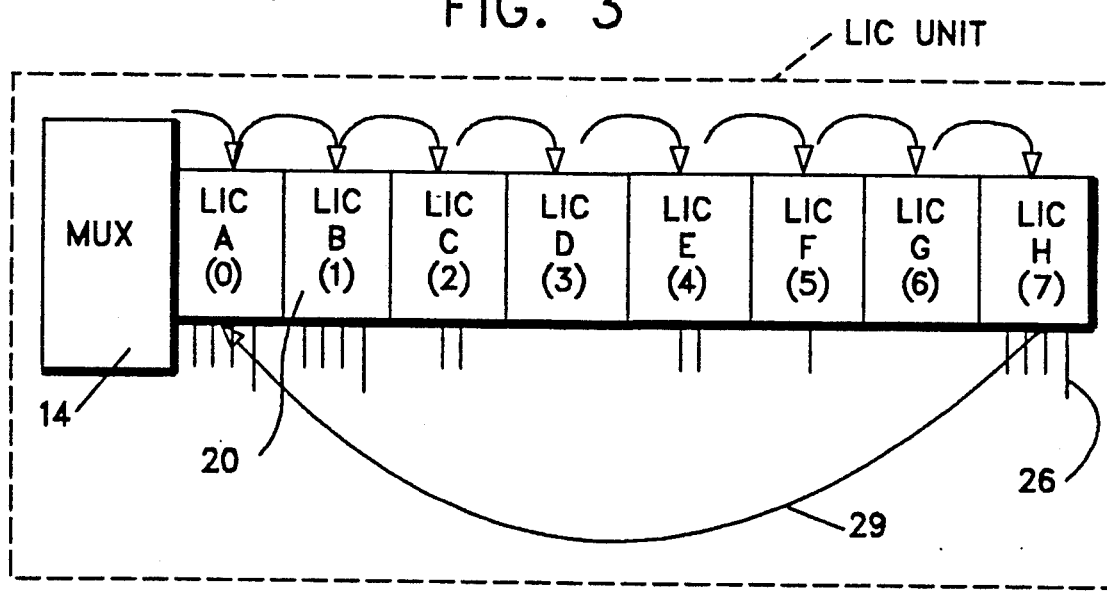
FIG. 3 represents a configuration of a LIC unit having eight LICs plugged.

In the known scanning scheme illustrated in FIG. 3 with reference (29), if eight LICs A, B through H were connected to the scanner, they would be scanned in the same order: A, B, C, . . . H, A . . . This would occur even if the lines connected on LICs B through H were inactive and resulted in a throughput drop for the scanner.

The selective scanning process of the present invention consists firstly in scanning only those LICs which are connected to active lines and therefore called active LICs, and secondly in scanning the LICs in a sequence predetermined by the operator, independantly of the physical position of the LICs in the scanning loop (29). Therefore, according to the invention, a given LIC (A through H) to be scanned can be given a logical address independent of its wired address (0 through 7, shown by bracketed numerals in FIG. 3), and during the scanning, the LICs which have been re-addressed are known to the scanning means only by their logical addresses.

Figure 4:
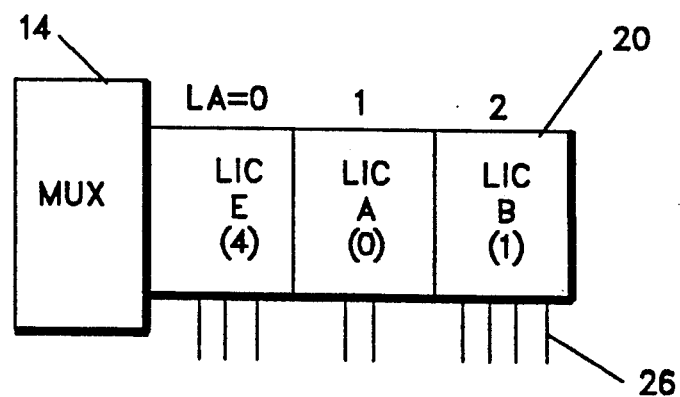
FIG. 4 represents a LIC unit configuration with three LICs plugged.

An illustration of this method is given in FIG. 4 where three active LICs (E,A,B) are connected to the scanning means through the multiplexor (14): the LIC (E), having a wired address equal to 4 (FIG. 3) and a logical address equal to 0, the LIC (A) having a wired address equal to 0 and a logical address equal to 1, and the LIC (B) which has a wired address equal to 1 and is given a logical address equal to 2. In this case, LICs C, D, F, G, H are not scanned because they don't presently support any active lines. Of course, as a result of the method, if the operator wants to plug the lines (26) to different LICs in order to modify their scanning order, he won't have to unplug the lines or LICs physically, but will only have to modify the logical addresses of the LICs.

As a consequence of the re-addressing of LICs (E,A,B) with respect to their wired addresses (4,0,1) as shown in FIG. 3, this particular LIC configuration will be scanned according to the shortest possible scanning scheme since the active LICs E,A,B are the only LICs scanned, and LICs C,D,F,G,H are not scanned.

It will now be explained how a LIC can be given a logical address, and how this address is modified upon need.

LIC LOGICAL ADDRESSING PROTOCOL

First it is to be noted that the scanner means (FIG. 2) are not "aware" of the address changes performed among the LICs; thus the scanner means perform, under control of the scanner microcode, the scanning of the active LICs in a predetermined sequence according to the apparent addresses (physical or logical) of the LICs.

For throughput considerations, this scanning sequence is preferably from LIC0 through LIC7 (and repeat) if all the LICs are active.

However, for the same throughput considerations, if for instance three LICs: LIC0, LIC5 and LIC7 are present (LIC7 meaning LIC with physical address 7), the scanner should scan LIC(0), LIC(1) and LIC(2) where (0), (1) and (2) refer to logical addresses.

This shows the interest of translating in this particular case, the wired adresses 5 and 7 of LICs 5 and 7, into logical adresses 1 and 2.

However, if three LICs: LIC0, LIC1, LIC2 were present, they would not need to be re-addressed with logical addresses, since their physical addresses already correspond to the best possible scanning scheme: 0,1,2. But this is true only if LIC0 is the one which supports the highest traffic. If not, a logical re-addressing would be necessary to obtain the most efficient scanning scheme.

Besides, it is to be noted that the passage, for a given LIC, from a physical address to a logical address takes a certain duration during which the corresponding LIC must be disabled in order to avoid conflicts between two LICs having one physical address (a) and the other the same logical address (a).

It will now be explained how the duration necessary for the logical addressing is provided in conjunction with the timing of the transmission of data and control frames on the serial link (12) between the scanning means (10,16,17) and the MUX (14) (FIG. 2).

Figure 5:
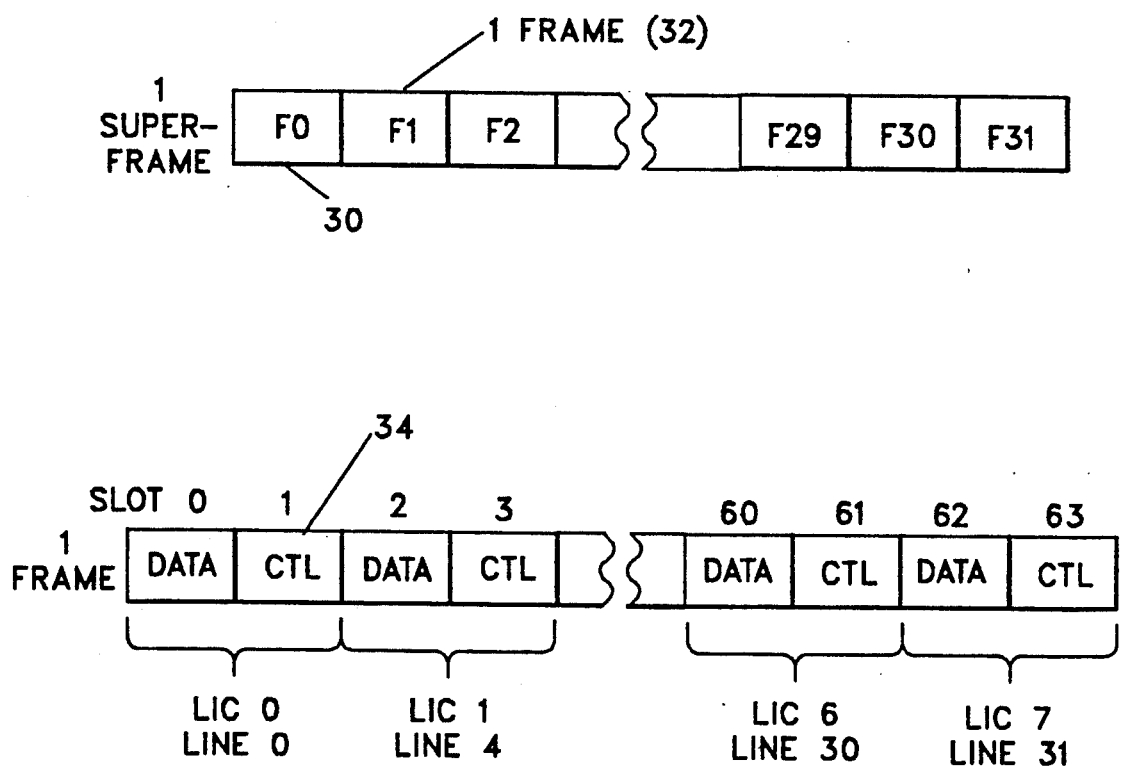
FIG. 5 represents the structure of the serial data flow between scanner and multiplexer represented in FIG. 1.

FIG. 5 shows the data and control bits organization on a serial link similar to the serial link described in patent EP-A-0.232.437 A1. The bits transmitted on the serial link (12), in the inbound direction (from the LICs to the scanner) as well as in the outbound direction (from the scanner to the LICs) are organized into superframes (30), frames (32) and slots (34).

In a preferred embodiment, a superframe includes 32 frames F0 to F31, and a frame includes 64 slots of eight bits: 32 data slots and 32 control slots, each couple of slots corresponding to the data and control bits transmitted on one transmission line (26). Moreover, the even frames are dedicated to data exchange between the scanner and the LICs, while the odd frames are dedicated to the exchange of control tags. As will be described further in greater detail, the steps of the logical addressing protocol will require the setting and reading of control registers located in the LICs. The content of said control registers will be exchanged between the scanning means and the LICs through dedicated control slots of each super frame on the serial link. This will be explained in relation to FIGS. 6 and 7.

Figure 6:
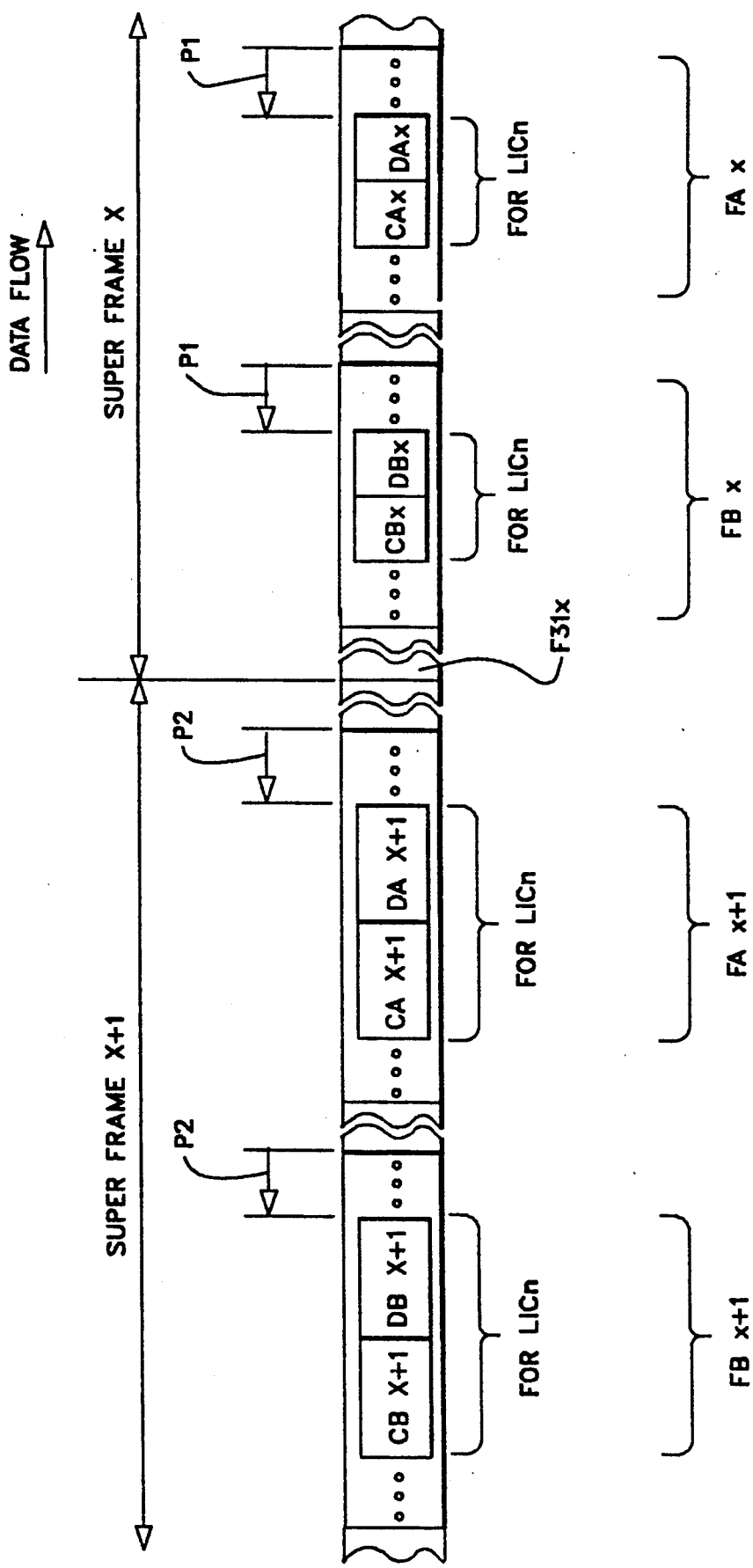
FIG. 6 represents the frames of two superframes being involved in a logical adressing operation.

As described in the aforementioned patent EP-A-0.232.437 A1, the addresses of the LICs are specified, in inbound as well as in the outbound transmission in a determined control frame of each superframe: FBx for superframe x, FB(x+1) for superframe x+1, ... (FIG. 6). Thus, a given line of a given LIC has its address specified in a determined control slot of said determined control frame. Consequently, if a LIC supports, for example, 4 lines, the control frames FBx,FB(x+1), ... will contain 4 control slots each including the address of said LIC. According to the periodic scanning scheme described in the cited prior art, said four control slots are regularly distributed over each control frame FBx, FB(x+1), ...

As long as the LICs have not been given a logical address, the addresses contained in the control slots CBx, CB(x+1) ... of corresponding frames FBbx, FB(x+1) ... are the wired addresses of the LICs. If there are, for example, 8 LICs per LIC unit, the addresses are encoded on three bits b0b1b2 as shown in FIG. 7.

Figure 10:
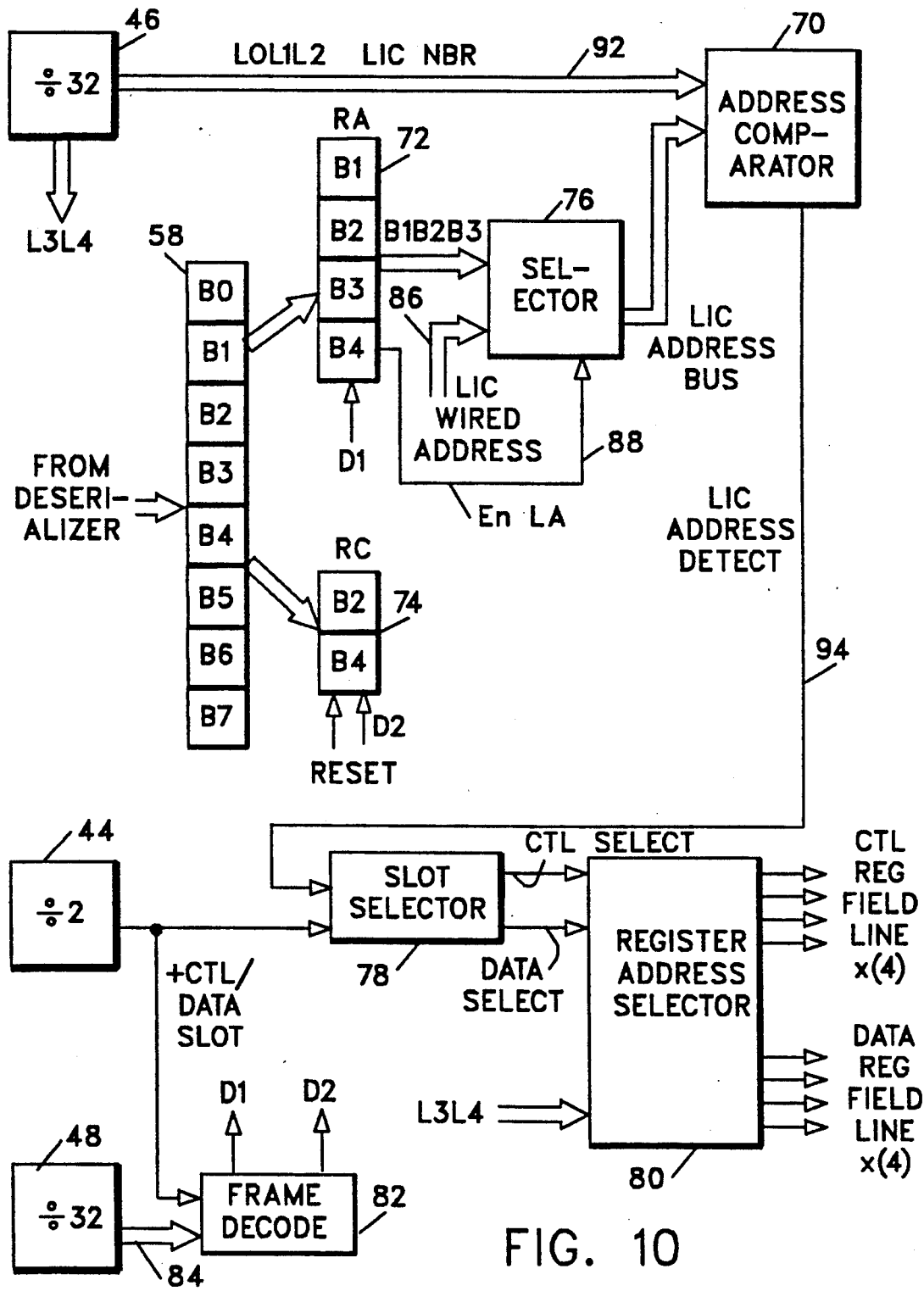
FIG. 10 represents a time window generation circuit allowing to a given LIC to communicate with the multiplexer at a given time.

Now let us assume that the operator wants to modify the scanning scheme of the LICs. He will send, through the scanner microcode, a logical address to all the LICs to be re-addressed. For instance, if the LIC n (with n=b0b1b2) is to be re-addressed with logical address n'=b'0b'1b'2, the microcode will load the corresponding control slot CBx containing b'0b'1b'2=n' onto the outbound serial link. Upon reading of this control slot CBx by LICn (in a manner described further), the logical address n'=b'0b'1b'2 is set into an internal register of LICn, called "logical address register" RA (72) (FIG. 10).

According to the invention, the LICn is not immediately operative with the new address n': if it were, it could be in conflict on the serial link with another LIC having a wired address equal to n'. Therefore, according to the invention, once set into LICn upon receipt of slot CBx of frame FBx, the logical address n' is "confirmed" upon decoding by LICn, from the outbound serial link by a synchronization tag provided in a succeding frame: for instance, the last frame F31x in the outbound serial link. Then, the LICn is enabled with the logical address n' upon receipt of the control slot CA(x+1) of the frame FA(x+1) located in superframe (x+1). This is done by decoding the control slot CA(x+1), which contains two LIC enable bits E0, E1. The status of those bits determines the operation mode of the LIC which receives them, as will be described further.

It is also to be noted that the LICn decodes its logical address n' from a control slot CBx, the position of which is "p1" relative to the beginning of frame FBx. But, once the logical address n' is set into LICn, the latter gets the information dedicated to it from slots previously dedicated to LICn'. This is the case for the slot CA(x+1) (FIG. 6) containing E0E1; said slot CA(x+1) has a position "p2" different from "p1", relative to the beginning of frame FA(x+1).

Figure 8:
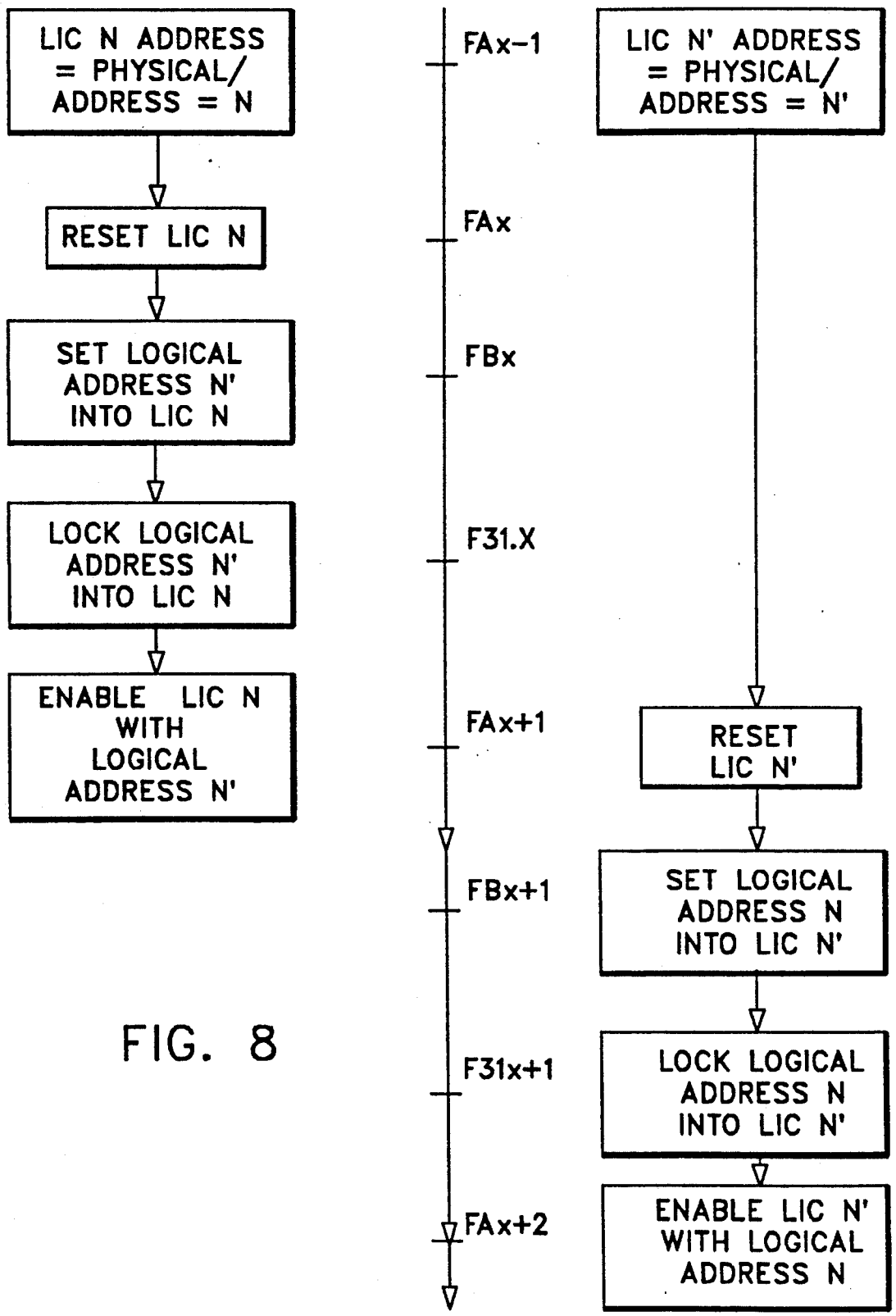
FIG. 8 represents a flowchart of the protocol for swapping addresses between two LICs.

The logical addressing protocol is schematicly shown in FIG. 8. The left part of FIG. 8 shows how the LICn (that means the LIC of physical address n) is re-addressed with a logical address n', while the right part of said figure shows how the LICn' (i.e. LIC of physical address n') is re-addressed with a logical address n. Consequently, the left and right parts of FIG. 8, considered as a whole, show the steps of the protocol for swapping the addresses between the LICs n and n'.

Before the beginning of this protocol, the LICn has an address as seen by the scanner means equal to its wired address n and the LICn' has an address equal to its wired address n'.

This means that until frame FAx, LICn listens to (ie reads) all the data and control slots transmitted by the scanner means to all the lines (for example four lines) connected to LICn. To do this, the LICn receives a "LIC address detect" signal generated as further described. Upon receipt of said signal, the LICn decodes the content of the outbound slots transmitted on the serial link.

It also means that until frame FAx, the LICn "speaks" (ie writes) into all the data and control slots of the inbound serial transmission, which correspond to the lines connected to LICn. Those data and control slots are transmitted by the lines to the scanner means.

Before the LICn is given a logical address, it is reset (during frame FAx), so that it can no longer hear or speak on slots dedicated to it. If this were not done, it would create conflicts as soon as the LICn were given a logical address.

Once reset, the LICn is ready to be given a logical address n', which happens during frame FBx. This means that once this logical address n' is set and locked into LICn (frame FA(x+1)), the latter exclusively listens to and writes into the slots of the serial link which are dedicated to LICn'. Of course, by the time the LICn is enabled with logical address n', the LICn' is reset in order to avoid conflicts with LICn which has been re-addressed with logical address n'. Thus, at the latest, LIcn' is reset during frame FA(x+1) as shown in FIG. 8.

To determine the moment when the logical address n' is really set into LICn, this logical address is locked once set; for instance this may occur during the last frame of superframe x: F31x. But the lines of the LIC are not yet enabled, and this is done separetely during frame FA(x+1), as will be explained below. The protocol for affecting a logical address change of n' in LICn is finished after frame FA(x+1). However, in the case of an address swapping operation, similar steps have to be performed in order to assign to LICn' the logical address n.

Therefore, the logical address n is set into LICn' during frame FB(x+1) and locked during a subsequent frame, for instance F28(x+1), or the last frame of superframe x+1: F31(x+1). Finally, the lines connected to LICn' are enabled during the frame FA(x+2) of the serial data flow.

Once the previous protocol has been completed for both LICs n and n', the exchange of data and control bits between the scanning means and the lines connected to LICn has been transferred onto LICn' and the exchange of all the data and control bits between the scanning means and the lines connected to LICn' has been transferred onto LICn. Since the scanning means have not modified their scanning scheme, it results that by modifying certain LIC addresses using the logical addressing function, the operator can simply obtain for the active lines the most efficient scanning order in consideration of the actual traffic on each line.

It is clear that in each LIC there must exist an apparatus, including address and control registers, in order to access the serial data flow (inbound and outbound) in time and in order to monitor the status (enabled, disabled) of each LIC. This apparatus will now be described as a preferred, but not exclusive, embodiment of the invention.

PREFERRED EMBODIMENT OF THE INVENTION

From now on, the frames referenced as frames "A" and "B" in each superframe will be respectively equal to frames 13 and 27, because the time duration between two succeeding such frames 13 and 27 is convenient for executing the logical addressing operation. However, other frames may be taken in each specific embodiment.

When LICn, having a wired address n and a logical address n', has to transmit the information from the lines connected to it toward the scanner means, it must load said information (data and control slots) into the very slots of the inbound frames which are known by the scanner as normally containing data and control bits from LICn'. According to the structure of the serial link data flow, these slots are determined by their relative position in the frames. This position is recognized by the LICn by means of a count of the frames and slots of the data flow, each couple of slots (data+CTL) corresponding to a line connected to the LIC.

Therefore, two problems have to be solved: how the LICn puts on (or takes from) the wires of the serial link the data and control bits that it wants to exchange with the scanner means, and especially with the multiplexor (14) (FIG. 2), and how the timing of this operation is provided.

Figure 9:
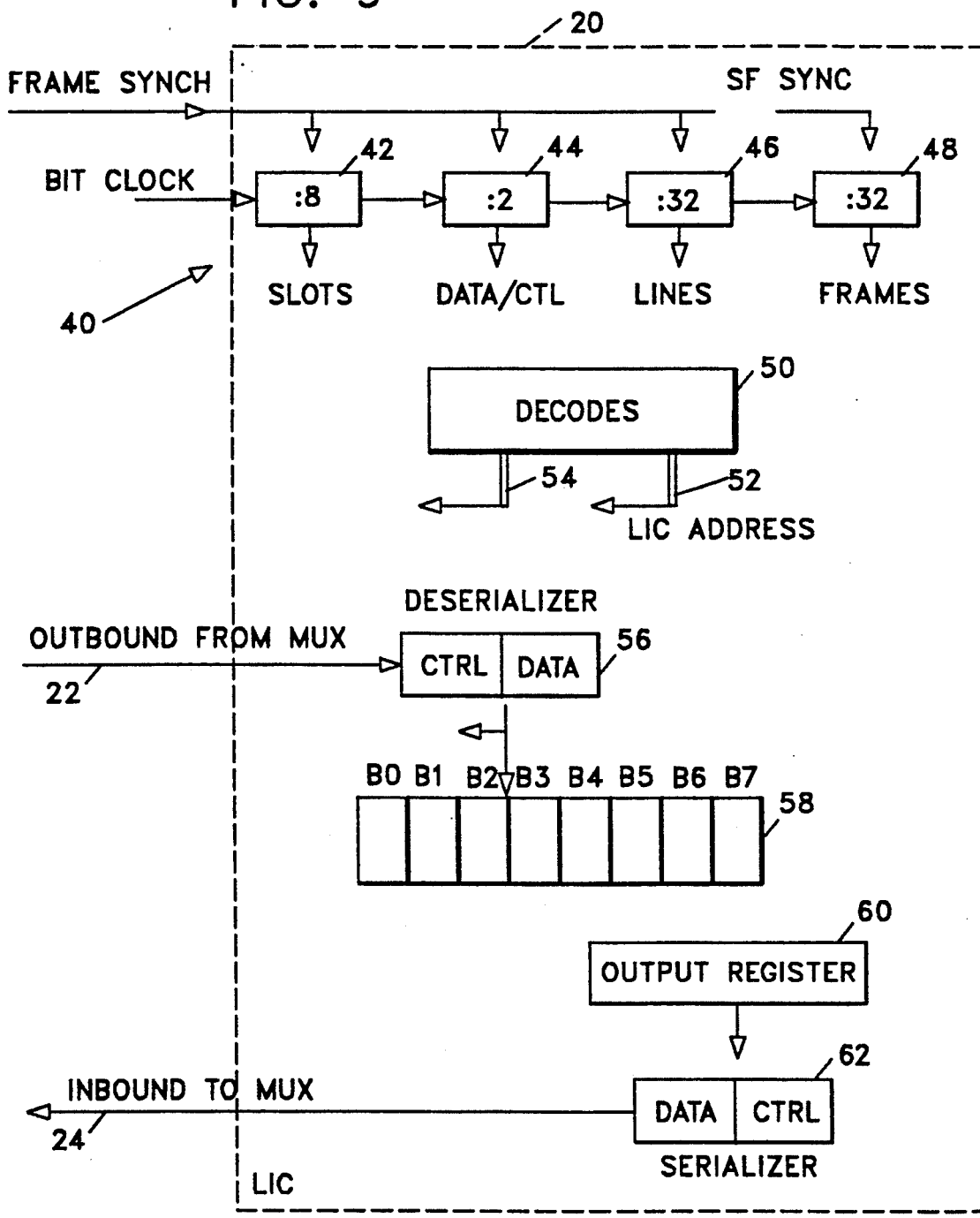
FIG. 9 represents the hardware needed for connecting the LICs onto the inbound and outbound lines.

The inbound/outbound access by a given LIC to the data/control slots of the serial link frames is provided by a serializing/deserializing circuit (35) shown in FIG. 9. This figure shows only the MUX/LIC interface circuits; the remaining circuits of a LIC are well-known in the art and are not further described here. The multiplexor (not shown) provides each LIC with a frame synchronization signal FRAME SYNC and a superframe synchronization signal SF SYNC. This allows the LIC to locate the successive frames, lines and slots of the serial data transmission. Therefore, each LIC includes counting means (40) incremented at bit clock rate, and implemented with dividers (42,44,46,48).

In the example chosen for the present embodiment, each superframe contains 32 frames having each 64 slots (32 data slots, 32 control slots) of eight bits each. Therefore, the counting means (40) include a series-connected divide by eight counter (42) activated every eighth bit clock pulse, a divide by two counter (44) activated at each data and control slot, and two divide by 32 counters (46,48). The divide by eight (42) provides to the divide by two (44) the slot count; the divide by two (44) provides to divide by 32 (46) the line count, and the divide by 32 (46) provides to the divide by 32 (48) the frame count. Besides, the outputs of said dividers are transmitted to a decoder circuit (50) which provides at its output a "LIC address bus" (52) and a "LIC register address bus" (54) as will be described in relation to FIG. 10.

As further shown in FIG. 9, the bits coming from the MUX (14) on line (22) are put into a deserializer (56) which is a 16-bit shift register. When two slots have been received, they are loaded into the proper LIC input register (58), the address of which is given by the decoding circuit (50) as previously mentioned.

Similarly, the line/frame counting means (40) and the decoding means (50) give the address of the line to be sent to the MUX on the inbound serial line (24). Therefore, the content of the internal output register (60) corresponding to said line is loaded into a serializer (62) which sends it bit after bit to the multiplexor (14).

The serializer (62) is a 16-bit shift register driven by the bit clock. It is to be noted that for more clarity, only the internal registers (58,60) concerned with the exchange between a given line (26) connected to the LIC and the multiplexor have been represented in FIG. 9.

FIG. 10 shows how a time window "LIC ADDRESS DETECT" is generated in order for each LIC to detect its address and to be granted timely access to the serial data flow, for an inbound or outbound data transmission operation. In addition to the dividers (44,46,48) described in relation to FIG. 9, each LIC includes an address comparator (70), an address register RA (72), a control register RC (74), an address selector (76), a slot selector (78), a register address selector (80) and a frame decoder (82). The divider (46) derives from the frame synchronization tag (FIG. 9) the LIC count which is encoded on three bits L0L1L2, as well as the line addresses of said LIC, which are encoded on two bits L3L4 corresponding to the least significant bits delivered by said divider (46). The eight-bit words provided by the deserializer (56) are continuously loaded into the parallel register (58). From there, the bits B0B1B2B3 corresponding to the logical address to be set into the LIC are latched into a four-bit address register RA (72) upon a D1 decode. This D1 decode correspond to the control slot of frame 27 dedicated to this particular LIC and its generation will be described below. Similarly, the bits B2B4 (corresponding to the E0E1 bits of FIG. 7) are also latched into a two-bit register RC (74), upon a second decode D2.

Both D1 and D2 decodes are provides by a simple decoding logic (82) receiving as inputs the frame and slot counts provided by dividers (44,48). D1 is activated during frame 27 when the control slot dedicated to this LIC is received by register (58), and D2 is activated during frame 13 under the same condition.

The three first bits B1B2B3 contained in the address register RA (72) correspond to the logical address decoded from the serial data flow, while the fourth bit B4 corresponds to the status of an "Enable Logical Address" EnLA.

The LIC wired address is provided by the LIC on bus (86) and transmitted to an address selector made of AND gates (not shown), which also receive the bits B1B2B3 corresponding to the logical address. Therefore, when the EnLA signal is active on line (88), the address selector (76) outputs said logical address on logical address bus (90). In the contrary, the LIC wired address is transmitted on bus (90) to the address comparator. The latter is also made of simple comparison logic which performs the comparison between the logical address provided on BUS (90) and the LIC count L0L1L2 derived from the serial data flow by the counting means (40), and put on BUS (92). If the comparison detects an equality, a "LIC address detect" signal is generated on line (94) within the LIC, meaning that the data and control slots presently on the serial data flow concern this LIC. The control or data slot discrimination is made by the slot selector (78) which outputs, alternatively, a "CTL select" signal or a "Data select" signal, both transmitted to the register address selector (80) made of simple gating logic. Accordingly, this activates a "control" tag or a "data" tag corresponding to the line of the LIC specified by the line address bus (96) so that the device (not shown) connected to said line can exchange the information of the slots of the serial data flow with the adequate internal registers.

It is to be noted that, although in the preferred embodiment of the invention, the timing of the logical addressing steps is provided by the countings derived from the serial data flow clocks (superframes, frames . . . ), a similar timing could have been provided by adequate sequencing means if the scanning means (10,16,17) were connected to the LICs by a parallel bus instead of the serial link.

LIC ACCESS TO SERIAL DATA FLOW

Figure 11:
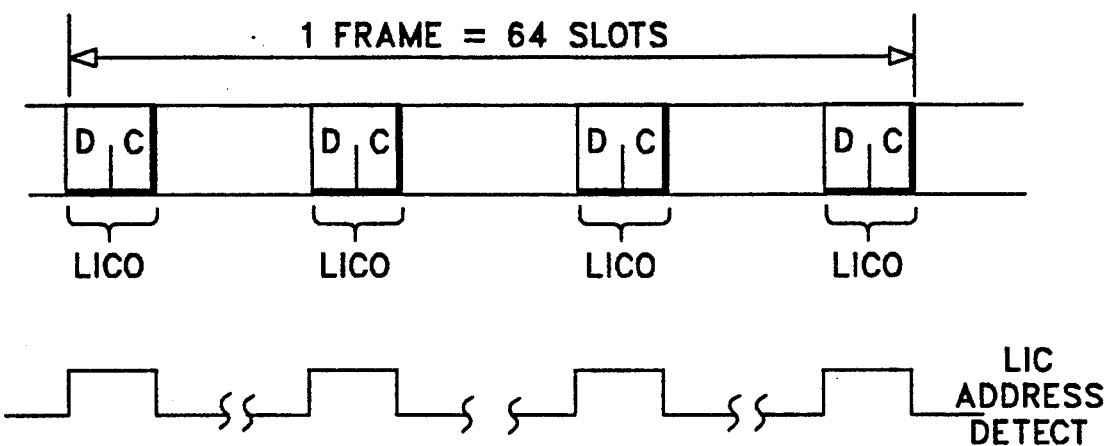
FIG. 11 represents for a given LIC, the time window generated by the circuit of the FIG. 10.

Each LIC includes means for generating during each frame a dedicated time window called "LIC ADDRESS DETECT" shown in FIG. 11. During this time window, the LIC exchanges data/control bits with the serial data flow. Of course, the time windows of the different LICs are non-overlapped. For the case shown in FIG. 5, where each of the 8 LICs is concerned four times in each frame (once for each line connected to said LIC), the time window is accordingly generated four times in each frame.

It is to be noted that the LIC ADDRESS DETECT signal is also dipatched (not shown in FIG. 10) to all the registers of the LIC which have to exchange data with the serial data flow between LICs and scanning means. Thus, all these registers can read or write only when the corresponding LIC ADDRESS DETECT signal is active.

The operation performed by the LIC during this time window depends of the operation mode affected to the LIC during a previous frame (setting of E0E1). Outside of its dedicated LIC ADDRESS DETECT window, a LIC has no action with the serial data flow.

HARDWARE IMPLEMENTATION

The logical addressing needs, for each LIC, the two registers RA(72) and RC(74) containing, respectively, the logical address of a LIC, and a status corresponding to its operation mode. The address register (72) has been previously described and contains three bits B1B2B3 corresponding to the logical address, and an enable bit EnLA, which, when equal to 1, enables the logical address versus the wired address of the LIC.

Figure 13:
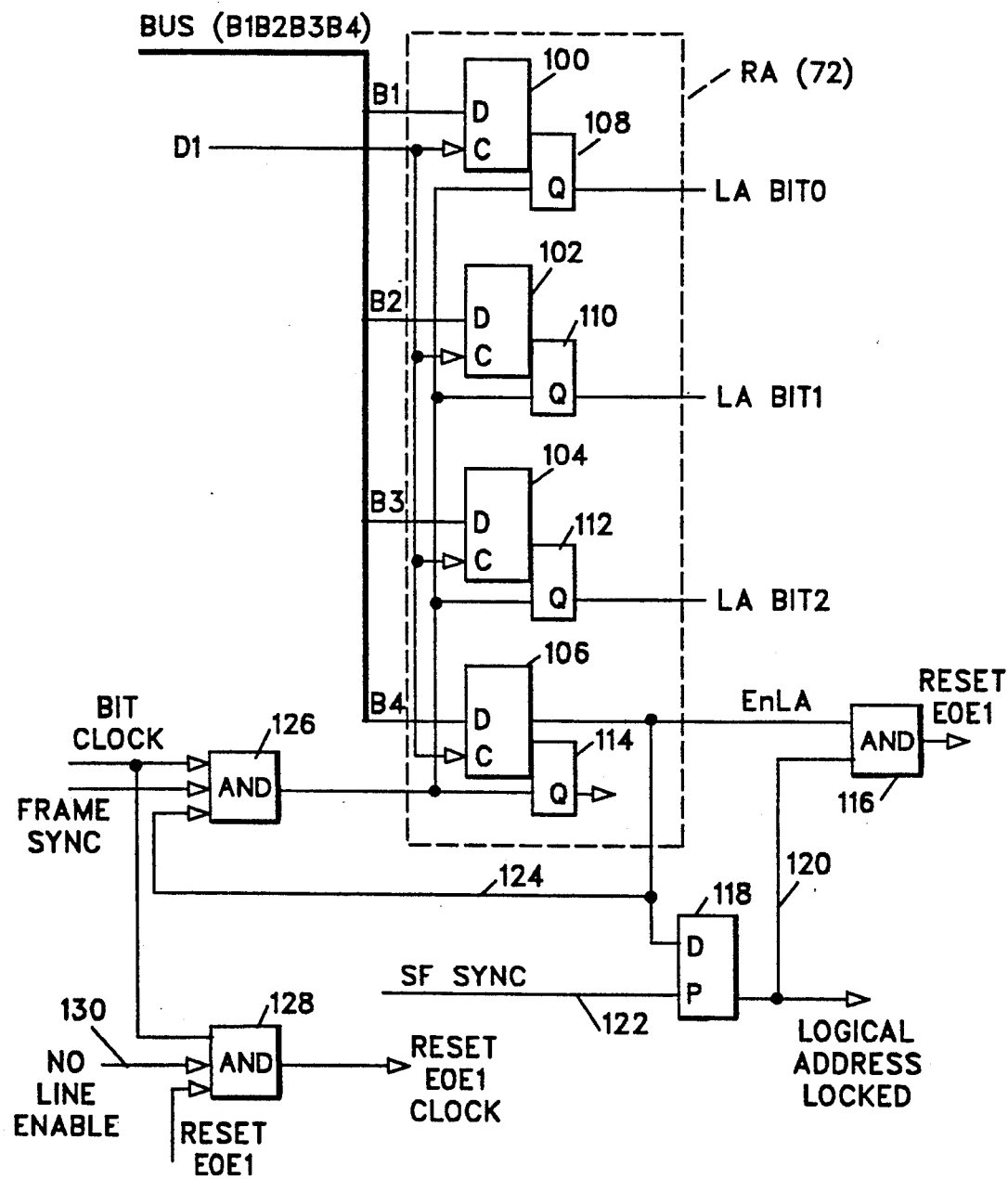
FIG. 13 represents an implementation of the LIC logical addressing circuit.

FIG. 13 shows the structure of the address register (72) with greater detail: upon D1 decode, the bits B1B2B3 of the logical address are latched into latches (100,102,104) and the bit B4 corresponding to the "logical address enable" bit EnLA is latched into latch (106) of said register (72).

CONTROL REGISTER DESCRIPTION

The control register includes 2 bits B1, B2=E0, E1 (FIG .10).

The value of bits "Line Enable E0 and E1" will drive 4 states inside LIC, corresponding to a LIC internal design which is out of the scope of the invention, and consequently not further described.

Previous to the description of the states driven by E0E1, it is to be noted that a LIC can be reset by a given RESET lead provided by the scanning means. This lead, when activated, resets the logic in the LIC and disables all the LIC interface drivers. Consequently, no information can be exchanged with this LIC.

After a LIC reset, all the lines connected to said LIC are automatically in a disabled state (line interface disabled): they accept Read/Write operations on the line registers of the LIC, but they don't handle data transmission/reception. However, whether its lines are enabled or disabled, each LIC not under reset monitors the incoming and outgoing frames which contain information belonging to registers concerning the lines. This allows the lines, even disabled, to receive commands from the scanning means and to pass status information (speed, . . . ) to the scanner.

—"E0 E1"="00": LIC hears but doesn't speak "00" is the status of E0 and E1 after reset of the LIC. This state is useful to handle logical addressing, since a LIC in this state can detect the logical address assigned to it and transmitted in frame 27.

In that case, the LIC monitors the outbound Serial data flow and loads all control slots corresponding to its physical address, especially the control slot of F27 containing its logical address.

But a LIC in this state does not load data slots from the serial link since the Line Interface is not enabled. Besides, as long as E0E1=00, the LIC does not speak on the inbound serial link, and all the inbound slots corresponding to its physical address are empty as if the LIC was under reset.

—"E0 E1"="01": the LIC hears and speaks and the Line interface is disabled. This state allows working with the physical address only. In that case, the LIC hears and speaks on the Serial Link on control slots corresponding to its physical address.

—"E0 E1"="10": LIC hears and speaks and the Line interface is enabled. This state allows working with the physical address only. In that case, the LIC hears and speaks on the Serial Link data and control slots corresponding to its physical address.

—"E0 E1"="11" with no Logical Address locked (EnLA=0): in that case, if no logical address has been previously locked:

the LIC hears and loads all control slots corresponding to its physical address. The Line Interface is kept disabled and, the LIC does not speak on the inbound serial link, all inbound slots corresponding to its physical address are empty as if the LIC was under reset.

But if "E0 E1"="11" with a Logical Address already locked, the LIC hears and speaks; the Line Interface is enabled after d.

DESCRIPTION OF A LIC LOGICAL ADDRESS SWAPPING OPERATION

Let us consider two LIC's, one plugged on physical address n' (LICn'), the other one plugged on physical address n (LICn): the new "Logical Addressing" function described here will allow transport LICn data on logical address n' and by making a swap of addresses, transporting LICn' data on logical address n.

After the address swap, the serial link LICn' will take slots of LICn and LICn will take slots of LICn'.

The several steps to swap first LICn on logical address n' and then LICn' on logical address n are described hereafter:

Before the LIC logical addressing or address swapping operation begins, the two LICs are under reset.

Consequently E0 E1=00 for those LICs

Figure 12:
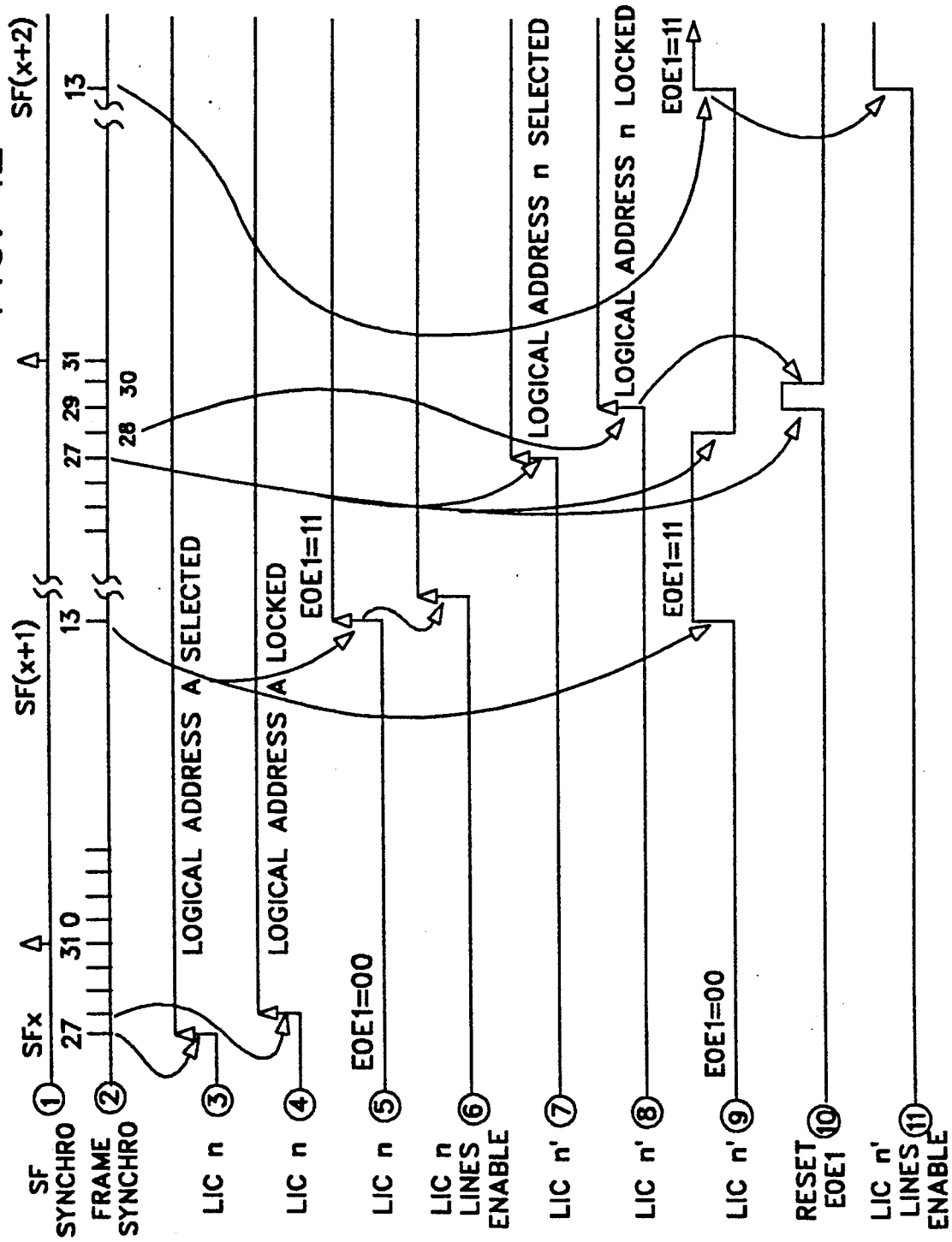
FIG. 12 represents the timings relative to an address swapping operation between two LICs.

Then, the LICn reset is released: since E0 E1=00, the LICn will load all control slots corresponding to its physical address n from the Outbound serial link, and LICn does not speak on Inbound slots. On frame 27 of superframe SFx, the LICn selects the logical address n' from the serial data flow (FIG. 12, time diagram 3), and loads it into its address register, as well as the "Enable Logical Address" bit, which is ON.

The logical address is locked, for instance, at the following frame synchronization: The LICn starts working on its logical address n' on Frame 28 (time diagram 4). Meanwhile, the LICn goes on hearing but not speaking on the Serial Link until a change of bits E0 and E1. Now, the LICn hears all control slots corresponding to address n'. Consequently, the LICn works on address n': notation LICn(n').

On frame 13 of next superframe SF(x+1), "E0 E1"="11" is loaded into the control register of LICn(n') (time diagram 5).

The new value of E0 E1 is sent to LICn on the slots corresponding to LICn'.

As soon as LICn gets "E0 E1"="11", the Line Interface is enabled. Thus, data and CTL slot exchange can take place between LICn(n') and scanning means (time diagram 6 in FIG. 12).

Then, the RESET of LICn' is released.

Once LICn' is out of reset, it hears but does not speak on Serial Link (E0 E1=00).

—LICn' goes on hearing on slots corresponding to physical address n' and not speaking, since no logical address is locked in LICn'. Consequently, LICn' loads "E0 E1"=11 since LICn' and LICn(n') are on the same slots (time diagram 9).

Then, the address register of LICn' is loaded with logical address n and the bit B4 "Enable Logical Address" is set ON.

The "LIC Address Register" of LICn' is loaded during frame 27 of SFX+1 (time diagram 7); the Logical Address n is locked at the following Frame Synchro: LICn' starts working on its logical address n on Frame 28 of SF(x+1) (time diagram 8).

—While LICn' is transferred on logical address n on Frame 28 Synchro, the bits "E0 E1" of LICn' are reset to avoid further conflicts with LICn(n'). This is done by a reset E0 E1 signal (time diagram 10), generated as explained in relation to FIG. 13, said reset E0 E1 signal being clocked by a RESET E0 E1 CLOCK signal.

It is to be noted that the "LIC address register" arriving on slots corresponding to physical address n' is received by LICn' and LICn(n'), but LICn(n') does not load it since LICn(n') has already locked a Logical Address.

Once Logical Address n is locked into LICn', LICn' works on address n: notation LICn'(n) with "E0 E1"="00".

LICn'(n) hears but does not speak on slots corresponding to physical address n because "E0 E1" have been reset.

Therefore, E0 E1=11 have to be loaded again into LICn'(n), which is done in frame 13 of SF(X+2): therefore, the new value of E0 E1 is send to LICn' on slots corresponding to physical address n (frame 13 of SF (x+2).

As soon as LICn' gets "E0 E1"="11", the Line Interface is enabled since a Logical Address has been locked in LICn'.

It is to be noted that to give a new Logical Address to LICn' or LICn, a Reset must be applied again to those LIC's.

The simple logic necessary in each LIC to provide signals like "Logical Address selected", "Logical Address locked", "Reset E0 E1", are shown in FIG. 13. This Figure shows also how to obtain the "Reset E0 E1 Clock" signal shown in FIG. 12, which is necessary to reset E0 E1 from 11 to 00, as explained before.

As shown in FIG. 13, the EnLa bit (B4) received by the address register RA(72) is latched by latch (106) upon receipt of D1 decode. This EnLa signal is then latched again by latch (118) upon receipt of a logical address locking command on wire (122). This command can be any subsequent frame synchro tag, for instance F28 synchro as previously described, or superframe synchro tag as well, as represented in the figure.

When the output of latch (118) is high, the logical address is locked. This signal is used (wire (120) together with the EnLA signal, and both are ANDed to create the RESET E0 E1 signal, the use of which was explained above. The RESET E0 E1 CLOCK signal is then generated, as long as no line has been enabled on that LIC, by ANDing the bit clock, the RESET E0 E1 signal and the NO LINE ENABLE signal, the latter being derived from the signal shown in time diagram 11 of FIG. 12.

Figure 14:
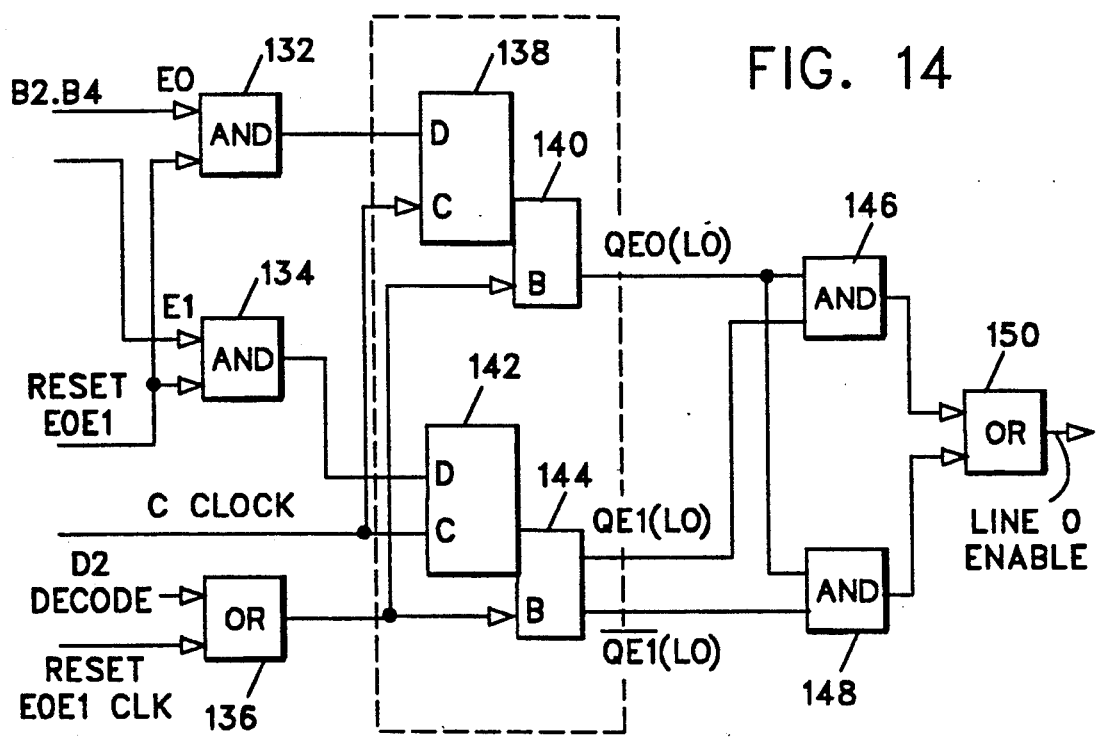
FIG. 14 represents an implementation of the circuit for enabling the lines connected to a given LIC.

FIG. 14 shows a possible way to implement the line enable and disable signals needed once a LIC is working with a Logical Address. The B2, B4 bits are fed, upon a C clock, to the latches (138, 142) of the control register RC(74) through AND gates (132, 134) which also receive the RESET E0 E1 signal. The line enable circuitry is shown only for line 0, for more clarity.

According to the simple logic provided, the line o is enabled only if E0E1=11. But the value of E0 E1 is only taken into account if it has previously been reset (RESET E0 E1 CLOCK activated) or set (D2 activated), which, combined with the latches (140, 144) providing confirmed E0 E1 status, avoids a line being enabled erroneously.

We claim:

1. A scanning protocol for scanning a plurality of serial transmission lines (26) connecting users' devices to scanning means (10, 16, 17) of a communication device, said lines being coupled to the scanning means through line interface couplers (LICs) (20) which are plugged to the scanning means at physical addresses whereby each line interface coupler LIC has a wired address corresponding to its physical address which is known to the scanning means, said protocol being characterized by the fact that, for each configuration of active line interface couplers effectively connected to active serial transmission lines each active line interface coupler LIC is re-addressable with a logical address corresponding to the wired address of any line interface coupler LIC in order to determine, for said configuration of active line interface couplers LICs, the shortest possible scanning scheme including only the active line interface couplers connected to active serial transmission lines, said scanning scheme being based upon the logical addresses.

2. A scanning protocol according to claim 1, wherein a line interface coupler LIC having a wired address n, is re-addressable with a logical address corresponding to the wired address n' of any other line interface coupler and the active line interface coupler of wired address n' is re-addressable with a logical address corresponding to the wired address n so that both line interface couplers LICs of wired address n and n' have their addresses swapped.

3. A logical addressing protocol according to claim 1, implemented in a communication device wherein each line interface coupler can be set in a disable or enable state for preventing or allowing said line interface coupler to receive and send data on the serial transmission lines connected to it, respectively, for re-addressing a line interface coupler of wired address n, with a logical address n', characterized by the fact that it includes the steps of:

setting the line interface coupler of wired address n to be assigned a logical address n', in its disable state
setting the logical address n' into line interface coupler of wired address n;
locking said logical address n' into said, and
setting the line interface coupler of wired address n re-addressed with logical address n' in its enable state.

4. A logical addressing protocol according to claim 1 or 2, implemented in a communication device wherein each line interface coupler can be set in a disable or enable state for preventing or allowing said line interface coupler to receive and send data on the serial transmission lines connected to it respectively, for swapping the addresses n and n' of two line interface couplers so that line interface coupler of wired address n be assigned n' as logical address and line interface coupler of wired address n' be assigned n as a logical address, wherein said protocol includes successively the steps of:

setting both line interface couplers of wired addresses n and n' in their disable states;
setting the logical address n' into line interface coupler of wired address n and locking said logical address n',
setting the line interface coupler of wired address n with the logical address n' previously set in its enable state;
setting the line interface coupler of wired address n' with the logical address n previously set in its enable state, so that after completion of said steps, the data traffic between the scanning means and the lines connected to line interface coupler of wired address n is transferred onto line interface coupler of wired address n', and the data traffic between the scanning means and the lines connected to line interface coupler of wired address n' is transferred onto line interface coupler of wired address n.

5. A logical addressing protocol according to claim 3 wherein said steps are performed through the exchange of control words between control registers (72, 74) located in the line interface couplers being re-addressed, and dedicated control slots (CAx, CBx) of the data flow arranged in superframes each one superframe comprising a plurality of frames with each frame comprising at least one control slot and a data slot assigned to each serial transmission line and each slot being able to transport a plurality of bits on a serial link (12) implemented between the scanning means (10, 16, 17) and the line interface couplers, the timing of said steps being provided by the bit, slot, frame and superframe counts of said serial data flow.

6. A logical addressing protocol according to claims 5 wherein, for the setting of a logical address n' into line interface coupler of wired address n, said line interface coupler decodes a first control slot CBx of a first control frame FBx in a superframe of the serial data flow, upon receipt by line interface coupler of wired address n of a LIC ADDRESS DETECT signal, said control slot CBx containing the logical address n'=b'0, b'1, b'2 to be set into line interface coupler of wired address n and a LOGICAL ADDRESS ENABLE bit (EnLA), the logical address n' being set into an address register RA (72) of line interface coupler of wired address n only if said LOGICAL ADDRESS ENABLE bit is inactive, and the logical address n' being effectively locked into line interface coupler of wired address n only upon receipt by line interface coupler of wired address n of a synchronization tag provided to line interface coupler of wired address n during a frame (F31x) succeeding frame FBx.

7. A logical addressing protocol according to claim 6, wherein the line interface coupler of wired address n is enabled with the logical address n' set during frame FBx, upon receipt by said line interface coupler of wired address n, of a second control slot CA(x+1) located in a second control frame FA(x+1) of a succeeding superframe (x+1), said second control slot CA(x+1) containing LIC enable bits E0, E1, the status of which determines the operation mode of said line interface coupler of wired address n.

8. An apparatus for the implementation of the logical addressing protocol according to claims 5 wherein said apparatus, located in each line interface coupler, includes:

counting means (40) incremented at the bit clock rate of the serial link and provided with a frame synchronization tag and a superframe synchronization tag, said counting means (40) providing a slot count, a line count and a frame count;

an address register RA (72) containing the logical address A=b0, b1, b2 affected to the LICn, and an "Enable Logical Address" bit (EnLA), said address register RA (72) being loaded, upon activation of a D1 decode, by a parallel register (58) continuously filled by a deserializer (56) providing the outbound serial data flow;

a control register RC (74) containing two "LIC Enable" bits E0 E1 provided to said register (74) by said parallel register (58) upon activation of a D2 decode;

an address selector (76) for selecting, according to the value of said EnLA bit, the physical address of the line interface coupler, provided by a wired address bus (88), or the logical address A provided by said address register RA (72);

an address comparator (70) for comparing a count derived from the serial data flow by the counting means (40), indicative of the slots assigned to the transmission lines connected to the line interface coupler, and the selected logical or wired address, said comparator generating a LIC ADDRESS DETECT time window in case of egality, for giving the line interface coupler access to the serial data flow during said time window.

* * * * *